(No Model.) 2 Sheets—Sheet 1.
T. MARR.
EGG CASE.
No. 416,297. Patented Dec. 3, 1889.
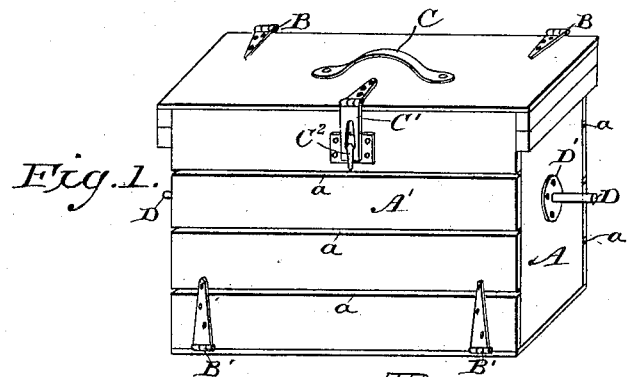
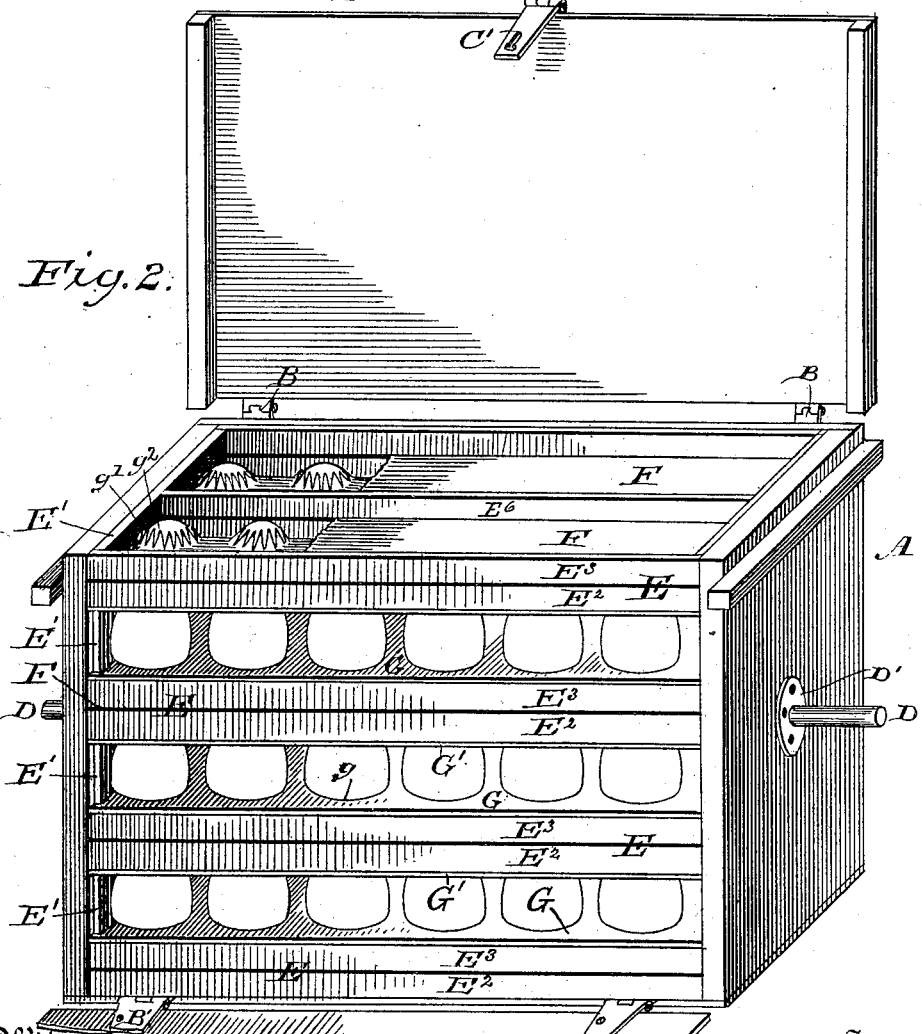
Witnesses:
H. C. Newman,
E. S. Newman,
Inventor
Thomas Marr,
By his Attorneys
Baldwin, Davidson & Wight (No Model.) 2 Sheets—Sheet 2.

T. MARR.
EGG CASE.

No. 416,297. Patented Dec. 3, 1889.

Witnesses
H. C. Newman.
E. S. Newman.

Inventor
Thomas Marr,
By his Attorneys
Baldwin, Davidson & Wight

N. PETERS, Photo-Lithographer, Washington, D. C.

UNITED STATES PATENT OFFICE.

THOMAS MARR, OF WARRENTON, VIRGINIA, ASSIGNOR, BY DIRECT AND MESNE ASSIGNMENTS, TO ROBERT A. MARR, JAMES P. JEFFRIES, AND GRANVILLE S. P. TRIPLETT, OF SAME PLACE.

EGG-CASE.

SPECIFICATION forming part of Letters Patent No. 416,297, dated December 3, 1889.

Application filed March 28, 1889. Serial No. 305,082. (No model.)

*To all whom it may concern:*

Be it known that I, THOMAS MARR, a citizen of the United States, residing in Warrenton, in the county of Fauquier and State of Virginia, have invented certain new and useful Improvements in Egg-Cases, of which the following is a specification.

The object of my invention is to provide improved means for packing eggs for transportation, so that they may be carried from place to place and handled without unusual care and yet be free from liability of breakage.

My invention consists in the improved frame, supports, and perforated sheets herein described, and specifically designated in the claims.

Figure 3:
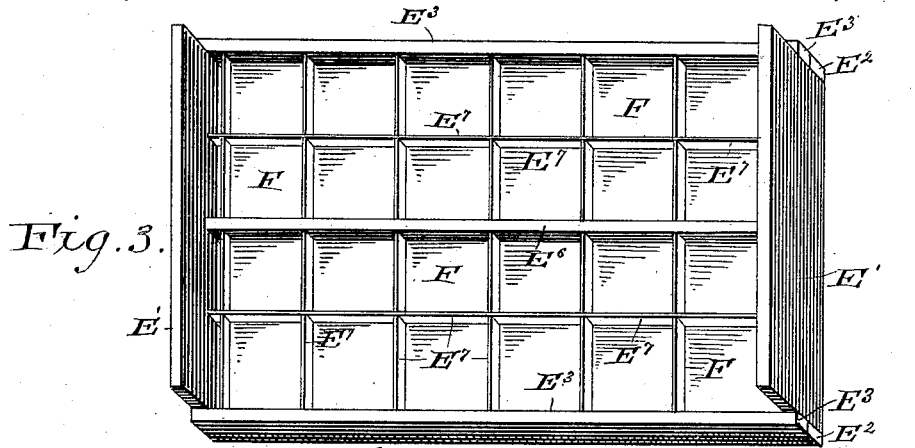
Figure 4:
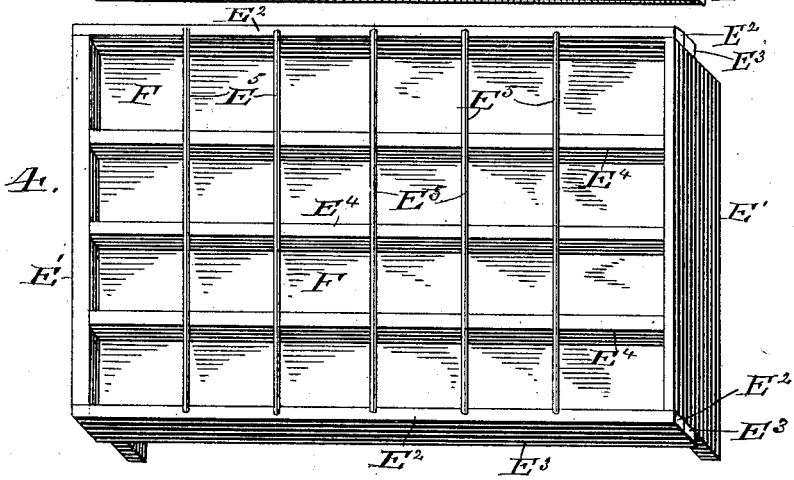
Figure 5:
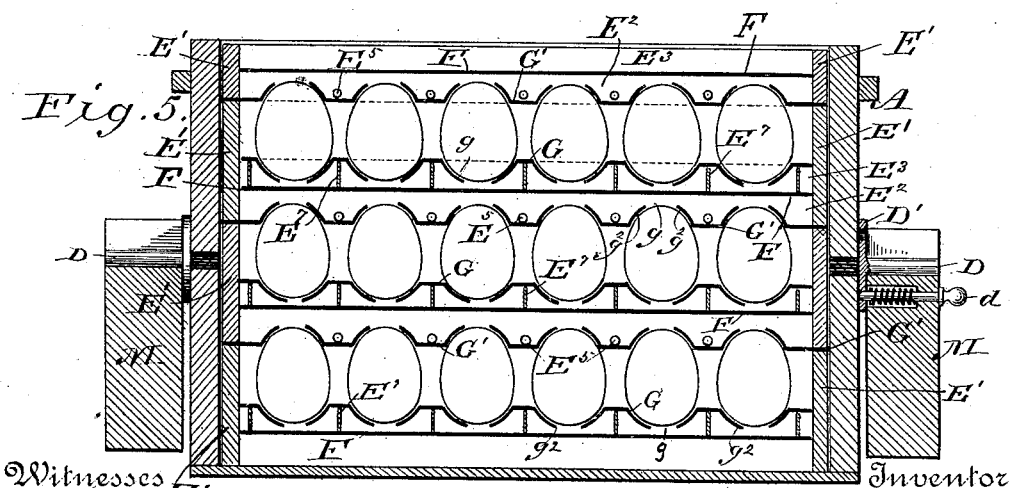

In the accompanying drawings, illustrating my invention, Figure 1 is a perspective view of the outside box closed and on a smaller scale than in the remaining figures. Fig. 2 is a perspective view of the box, showing the top and side lids open, and showing, also, the interior arrangement of the box and the eggs in their supports. Fig. 3 is a perspective view of the top of one of the frames arranged below the sheet on which the eggs are supported and held in position. Fig. 4 is a perspective view showing the reverse side of such frame with the sheet by which the tops of the eggs are held in position omitted. Fig. 5 is a longitudinal central section through the box and the egg-supports, showing the eggs in position.

The outside box or casing A may be of any desired construction, but is preferably such as illustrated in the drawings, and may be partially slatted, as shown in Fig. 1, at front and rear, leaving openings $a$ to admit of a free circulation of air, and also to admit light within the interior of the box, so that by opening the front end the eggs may be inspected. The top is hinged at B and the front side hinged at B'. The top is provided with a handle C and is connected to the front side A' by a hasp C' and pivoted locking-catch C².

A stud-journal D is secured to each side of the box in connection with a perforated plate D', the purpose of which is to suspend the box in frames in a cold-storage house, so that the box may have its position changed—that is, may be reversed—as by this means the eggs are kept more perfectly, as the yelks are prevented from settling in the shells.

As shown in Fig. 5, the boxes are mounted in a frame M, which is provided with a catch $d$, engaging with the plate D' to hold the box in any desired position.

The interior of the box is arranged as follows: A series of frames or carriers E, substantially similar in construction, are arranged one above the other and are each constructed as follows: Each frame is constructed with sides E', extending from front to rear of the box and connected at front and rear by cross-pieces E² and E³, and between the cross-pieces E² E³ in each section is clamped a thin sheet (preferably of card-board) F. The sides E' extend slightly above the end pieces E² E³ in all the frames except the top one. This sheet of card-board is imperforate and is rigidly attached to the frame, preferably being clamped between the cross-pieces E² E³. On the under side of each frame-section E, between the sides E', at equal distances apart, are arranged a series of strips E⁴, as shown in Fig. 4, and at right angles to these strips and beneath them, and connecting the front and rear pieces E², are arranged at equal distances apart wires or rods E⁵, as shown in Fig. 4. In the upper part of the frame, midway between the front and rear pieces, and extending from one side piece to the other, is a strip E⁶, (shown in Fig. 3,) and between this strip and the front and rear pieces E³ and the side pieces E' are arranged partitions E⁷, preferably made of card-board and arranged to form cells or compartments, one for each egg. The partitions E⁷ rest upon the sheet F, as shown in Fig. 5, and on the top of the partition is laid a removable sheet G, having circular openings $g$ at regular distances apart, formed by making creases in the sheet and cutting radial slits $g'$, forming pointed or triangular fingers $g^2$, which are more or less elastic, and which support the eggs. A similar sheet G' is arranged beneath the wires E⁵ of the section of the supports immediately above, so that there is a perforated sheet G, into which the bottom of the egg projects, and a perforated sheet G', into which the top of the egg projects.

As will be seen by reference to Fig. 5, the wires $E^5$ rest upon the sheets $G'$ between the perforations and hold the sheets in position. By this construction the eggs are all independently supported. Each one is firmly held and cannot be shaken about, does not come in contact with any other egg in the case, and cannot be thrown against any part of the casing. The box may thus be handled roughly in transportation without liability of breaking the eggs. The successive sheets in which the eggs are supported are not themselves utilized to support the upper sections of the egg-support.

The perforated sheets $G'$ are preferably made wider than the sheets G and rest between the side pieces $E'$, as shown in Fig. 5, and when the sections on the supports are moved the sheets $G'$ may be taken off, so that the eggs may be gathered up readily.

The top frame or carrier E is substantially the same as the others. The sides $E'$ are, however, made lower—i. e., they do not extend above the cross-pieces $E^2$ $E^3$, and the partitions $E^7$ and perforated sheet G are omitted.

Having thus described my egg-carrier, I declare that what I claim as my invention is—

1. The combination, substantially as hereinbefore set forth, of the outside box or casing and the egg-supports, each consisting of side pieces, front and rear connecting-pieces, a sheet F, partitions resting on said sheet, and a perforated sheet G above the sheet F, supported on the partitions.

2. The combination, substantially as hereinbefore set forth, of the outside box or casing and the egg-supports, each consisting of a frame made up of side pieces and front and rear pieces, cross-strips $E^4$, and wires $E^5$, arranged at right angles thereto, a sheet of cardboard or similar material F, resting on said strips, the partitions $E^7$, supported on the cardboard, the perforated sheet G, supported on the partitions, and the perforated sheet $G'$, into which the tops of the eggs project and on which the wires E bear.

3. The combination, substantially as hereinbefore set forth, of the outside box or casing, a frame consisting of front and rear pieces $E^2$ $E^3$, a sheet of card-board F, clamped between the pieces $E^2$ $E^3$, the partitions $E^7$, resting on said card-board, the sheet G, having circular radial slitted openings into which the bottoms of the eggs project, and the sheet $G'$, having radial slitted openings into which the tops of the eggs project.

In testimony whereof I have hereunto subscribed my name.

THOMAS MARR.

Witnesses:
  J. P. JEFFRIES,
  W. C. WEEKS.